INVENTORS:
PEMBROKE O. LEACH
WILLIAM P. JACKSON
VERNON W. CAMP

BY *Robert L. Olson*

ATTORNEY

United States Patent Office 3,423,563
Patented Jan. 21, 1969

3,423,563
BACK-UP SHOE FOR MOVING-TUBE SOLID PANEL WELDER
Pembroke O. Leach, William P. Jackson, and Vernon W. Camp, Chattanooga, Tenn., assignors to Combustion Engineering, Inc., Windsor, Conn., a corporation of Delaware
Filed Aug. 27, 1965, Ser. No. 483,075
U.S. Cl. 219—124
Int. Cl. B23k 9/12
5 Claims

ABSTRACT OF THE DISCLOSURE

Apparatus for welding tubes together, where the tubes are moved past a stationary welding head. A backing means is positioned between the tubes for supporting the molten metal joining the tubes, the backing means being of such a predetermined length that the molten metal is chilled sufficiently to maintain its shape before it loses contact with the backing means, said predetermined length also being such that there will not be shrinkage of the weld metal, due to cooling thereof, to such an extent that the thus welded together tubes will tend to bind on the sides of the backing means.

---

This invention relates to welding apparatus and its method of operation for welding together parallel members, and in particular metallic tubes, so as to form panels thereof.

A recent trend in the boiler industry is to line the walls of the furnace with boiler tubes which are welded together into integral panels. Most previous methods of welding tubes together utilized a movable welding head which moved longitudinally the length of two tubes, making a welded connection between the two tubes along their entire length. A copper bar positioned between the two tubes acts as a back-up for supporting the weld metal prior to solidification. This method is objectionable in that the long length of necessary table and the track for the movable welding apparatus, plus the large number of hydraulic clamps necessary for securing the tubes in position, are expensive. Also, tube handling onto and off the table is awkward and time consuming, as is aligning and clamping the tubes. Also, the frequent replacement of the long copper backing strip or chill bar is expensive and takes considerable time.

One other previous method utilizes stationary welding equipment, with the two tubes to be welded together moved therepast, as explained in more detail in Garner et al. Patent No. 3,127,503, which issued on Mar. 31, 1964. This method utilizes a rotating copper wheel, the upper rim of which acts as the back-up for supporting the weld metal prior to solidification. While this method eliminates most of the disadvantages of the stationary tube welding method, it also has some shortcomings. For example, the maximum welding speeds attainable are low, the width of the weld web must be kept to a minimum, and it is not possible to weld relatively small diameter, or thin-walled tubes together, if the weld and tube center lines are coincidental.

It is an object of our invention to provide a stationary welding apparatus and its method of operation, whereby tubes to be welded together are moved past it, without encountering the above mentioned difficulties.

The invention will be understood from the following description when considered in combination with the accompanying drawings wherein.

Figure 1:
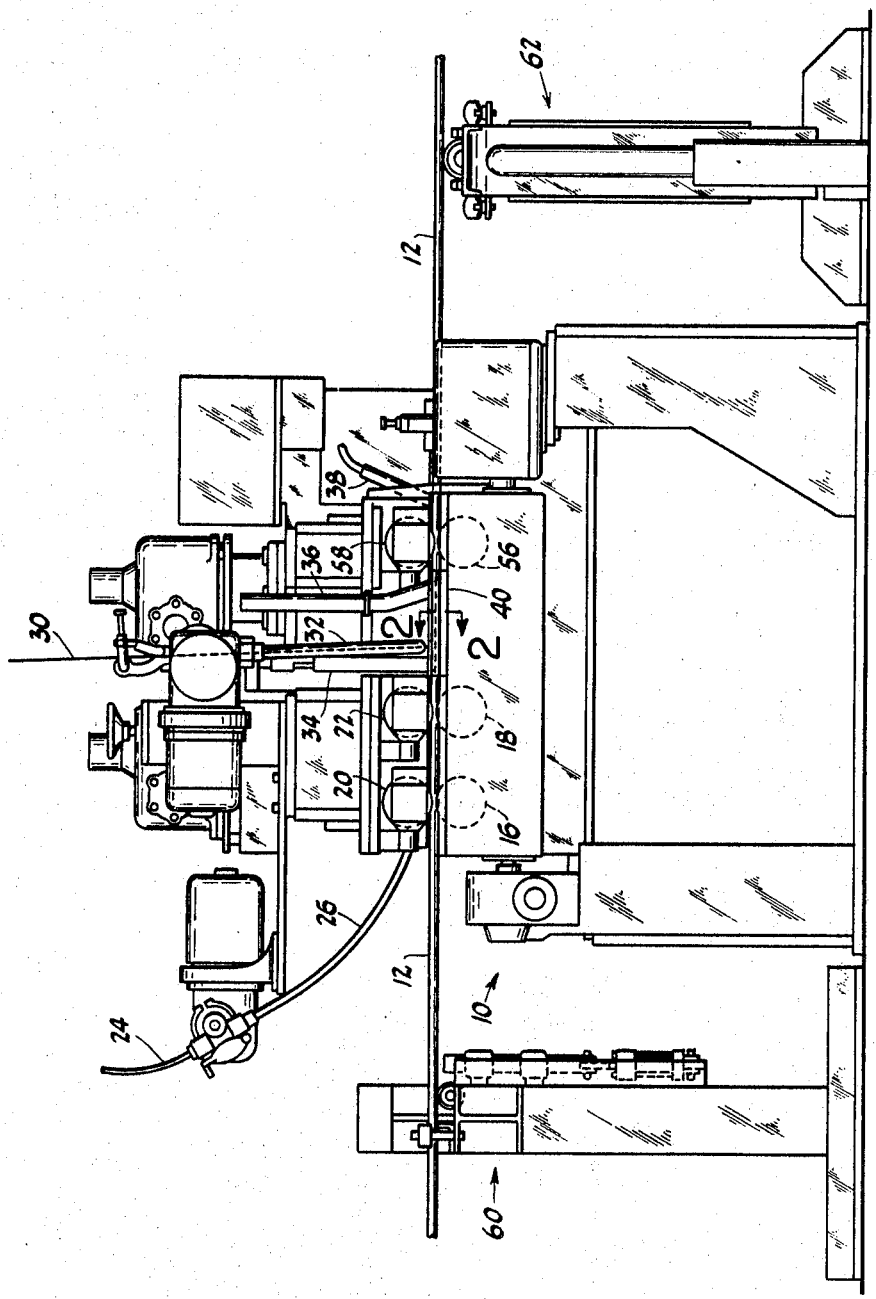
FIGURE 1 is a front view of a tube welder embodying our invention.
Figure 2:
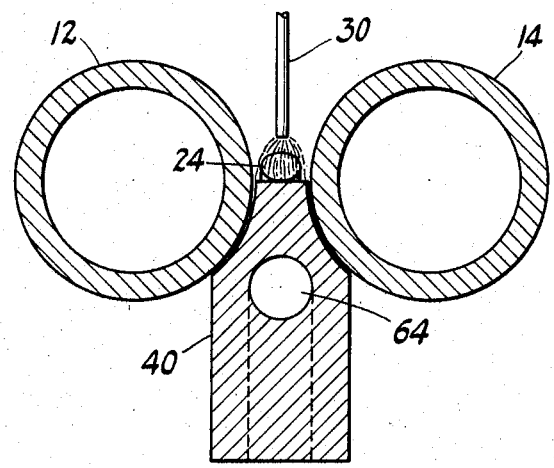
FIGURE 2 is an enlarged sectional view taken on line 2—2 of FIGURE 1.

Looking now to FIGURES 1 and 2, 10 designates a welding machine in its entirety. Numerals 12 and 14 indicate two parallel, spaced steel tubes to be welded together. The two tubes are fed into the welding machine by means of pairs of entrance drive rollers 16 and 18, which can be suitably gear or chain driven by means if a motor (not shown). The two tubes are held in engagement with the drive rollers by means of pairs of upper entrance guide rollers 20 and 22. These rolls also determine the final tube spacing and alignment.

The filler wire 24, which will partially form the web between the two tubes, is fed into the machine by means of filler wire guide 26. This filler wire 24 partially fills the space between the two tubes to be welded together. A consumable electrode wire 30 is positioned above the filler wire by means of electrode wire guide 32. The electrode wire and the filler wire are electrically connected such that an arc is established between the consumable electrode wire 30, and the filler wire 24. The source of current can be either AC or DC as desired. In order to shield the weld to prevent oxidation thereof, a flux dispensing means 34 deposits flux material on the weld area. Suitable flux recovery means 36 picks up the excess flux. Air chisel 38 clears or removes the slag from the weld.

Figure 3:
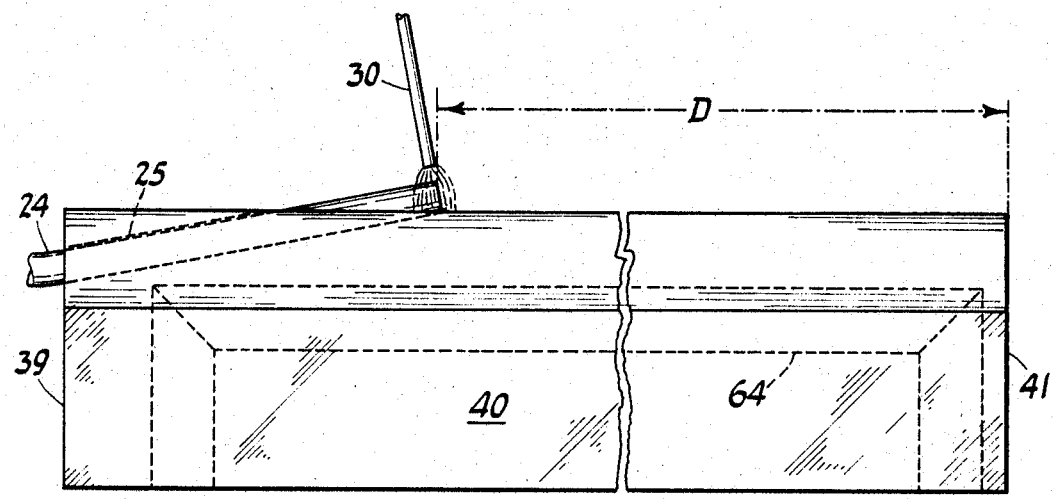
FIGURE 3 is a front view of the back-up shoe shown in FIGURE 2.

A back-up shoe 40 is positioned beneath the welding head, and the upper surface thereof extends between the two parallel tubes (FIG. 2), and substantially fills this space. The back-up shoe is made of copper, or other suitable material, and acts as a back-up, or chill-bar, for the molten metal. As shown in FIGURES 2 and 3, the back-up shoe is cooled by water which passes through passage means 64.

Looking again to FIGURE 1, a pair of exit drive rollers 56 are positioned on the outlet side of the welding head. Upper rollers 58 press the tubes into engagement with the lower drive rolls 56. The linear speed of the outer periphery of the drive rolls 16, 18, and 56 should all be the same. This can be accomplished by driving these rollers from the same motor, or by means of synchronized motors.

The operation of the welding machine will now be described. Tubes to be welded together are driven into the welding machine 10 and are suitably positioned and aligned by means of rollers 16, 18, 20 and 22. Filler wire 24 is fed into the machine in the space between the two tubes by means of filler wire guide 26. A welding arc is struck between electrode 30 and the filler wire 24 to melt and fuse them both into a web joining the two tubes 12 and 14. The upper surface of back-up shoe 40 acts as a back-up or chill-bar for the molten metal as it solidifies. The current being supplied to the electrodes, and the speed of movement of the tubes through the welding machine should be so adjusted that the filler wire 24 is completely melted, without fusing the upper surface of the copper back-up shoe thereto.

As shown in FIGURE 3, the filler wire 24 runs through a passage means 25 in the back-up shoe 40 and emerges therefrom so that its end is centered below electrode wire 30. This is more advantageous than merely positioning the filler wire above the back-up shoe, since the water-cooled copper shoe maintains extremely good contact for the ground current which flows from the electrode wire to the filler wire. This minimizes erosion of the upper surface of the shoe caused by the electric arc, since nearly all of the arcing is between the electrode wire and the filler wire. This filler wire guide passage also provides for a more efficient utilization of power, since a large percentage of the total power utilized is confined to the welding arc. Also, the improved ground contact between the filler wire 24 and the walls of the passage 25 results in less electrical "hunting," assuring improved and more stable control performance. Furthermore, there is no possibility of the filler wire wandering from the point directly beneath the electrode wire, as there would be if the filler wire were fed in entirely above the back-up shoe 40.

As illustrated in FIGURE 3, the dimension or length D of the copper back-up shoe, is critical. As is well known, molten metal as it cools and starts to solidify, will shrink. During the present welding operation, if the molten weld metal shrinks sufficiently, the two tubes will be pulled inwardly, and will tend to bind on the sides of the back-up shoe. Thus the length D of the back-up shoe, between the point at which electrode 30 deposits molten metal, and the outlet end 41 of the shoe, should be sufficient to permit the molten metal to solidify and support itself and hold its shape after it clears the end of the shoe, and yet be short enough so that no substantial shrinkage of the molten metal takes place.

The length D will vary depending on a number of conditions. For example, the faster the speed at which the tubes are moved through the welding machine, the greater the length D of the back-up shoe. Also, the wider the two tubes are spaced, and thus the greater the amount of molten web metal that must be deposited, the greater the length D becomes. Some of the other factors which must be considered in determining the ultimate length D for any given welding operation are the heat input, the mass and size of the tubes being welded, and the cooling rate of the molten metal caused by the tubes and the water cooled back-up shoe.

In order to insure a smooth, continuous, automatic welding operation, the tubes moving past the back-up shoe are spaced very slightly therefrom. It has been determined that a space of approximately .030" should be provided for between the tube and the side of the shoe. This space substantially fills up with flux, which is deposited ahead of the welding electrode, thus preventing any molten metal from escaping in this manner.

The length of the back-up shoe between the inlet end 39 and the point where electrode 30 enters is not of a critical nature. This distance should be great enough, however, to prevent molten metal from running off the upper surface of the shoe.

A few examples of welding operating conditions which have been tried and resulted in successful welds are as follows:

|  | 1 | 2 | 3 | 4 |
|---|---|---|---|---|
| Space between tubes (in.) | ⅜ | ½ | ¾ | 1 |
| Tube size, O.D. (in.) | 1 | 1½ | 1½ | 1¾ |
| Tube wall thickness (in.) | .136 | .220 | .180 | .180 |
| Voltage | 36 | 43 | 40 | 38 |
| Amps | 620 | 1,020 | 900 | 800 |
| Welding speed, inches per min. | 26 | 24 | 16 | 20 |
| Water flow through shoe, gal. per min. | 5 | 5 | 5 | 5 |
| Total shoe length (in.) | 8 | 8 | 10 | 15 |
| Shoe length from electrode to outlet end (in.) | 6 | 6 | 8 | 13 |
| Number of vertical wires | 1 | 1 | 1 | 2 |
| Number of horizontal wires | 1 | 1 | 2 | 2 |

All of the rollers 16, 18, 20, 22, 56 and 58 (FIGURE 1) are removably secured, so that more can be added when pairs of tubes are being welded to pairs, or panels of four are being welded together. Also, different sizes of tubes may be welded together by using different size rollers and different sized filler wire or metal bars. The copper back-up shoe is also removably secured, so that different shoes can be interchanged when it is desired to change the spacing between the tubes or tube sizes. The upper rollers 20, 22 and 58 should be mounted on their respective frames to allow for slight give or play in the rollers, which will accommodate slight irregularities in the tubes. This may be done by incorporating suitable springs or air cylinders or any other satisfactory means.

Figure 4:
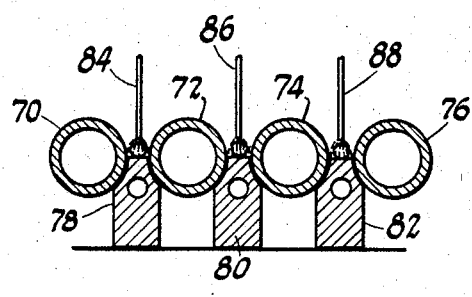
FIGURE 4 illustrates how more than two tubes may be simultaneously welded together.

FIGURE 4 shows the manner in which two or more webs can be cast or welded simultaneously, to weld three or more tubes together at the same time. This is accomplished by using a multiplicity of drive and guide rolls, back-up shoes, welding heads, etc. The three or more tubes are driven through the welding machine simultaneously, and a web is cast or welded between each parallel, adjacent pair of tubes by a plurality of welding heads, which webs are backed up by a plurality of copper back-up shoes.

Looking now to FIGURE 4, four tubes 70, 72, 74 and 76 are driven through a welding machine by means of guide and drive rolls (not shown), and welding electrodes 84, 86 and 88 deposit three webs of molten metal, one between each adjacent pair of tubes. These molten webs of metal are supported by the three copper back-up shoes 78, 80 and 82.

Although the apparatus and its method of operation has been described in connection with the formation of water wall panels which are composed of integrally welded thin walled tubes which are used in modern high capacity steam generators, it is to be understood that the welding machine has utility in refinements other than that herein employed to illustrate and explain the same. We therefore do not wish to be limited in the scope of our invention except as may be required by the claims.

What we claim is:

1. Apparatus for welding together two parallel, spaced metallic tubes continuously along their adjacent longitudinal portions, comprising: stationary backing means, having a first end and a second end, and being made of a material which will not become fused when directly exposed to a molten metal for a limited period of time, means for moving the two tubes longitudinally past the backing means in a direction from the first end towards the second end at a predetermined speed, said backing means being positioned such that the two tubes to be welded together pass by adjacent to the upper portion of the backing means, one tube being adjacent one side of the backing means, and the second tube being adjacent the other side of the backing means, stationary electric arc welding means positioned above the backing means for depositing a molten metal between said parallel tubes above the backing means, said molten metal, when solidified, forming a weld between said parallel tubes, the upper surface of said backing means being in contact with and acting as a support for the molten metal while it solidifies, said backing means being of such a predetermined length between the location of the electric arc welding means and the second end that the molten metal is chilled sufficiently so as to maintain its shape before it loses contact with the backing means, said predetermined length also being such that there will not be shrinkage of the weld metal, due to cooling thereof, to such an extent that the thus welded together tubes will tend to bind on the sides of the backing means.

2. A method of welding together two metallic tubes continuously along their adjacent portions comprising moving the two tubes in a horizontal direction past a first point in parallel, relatively closely spaced relation at a predetermined speed, depositing molten metal between the two tubes at the first point which completely spans the space between the two tubes, supporting the molten metal so that it moves in a direct horizontal direction along with the tubes for a predetermined period of time after it has been deposited, said predetermined period of time being such that the molten metal will have solidified sufficiently to hold its shape after removal of the support, said predetermined length of time also being such that little or no shrinkage of the weld metal will take place while it is thus supported.

3. Apparatus for welding together two parallel, spaced metallic tubes continuously along their adjacent longitudinal portions, comprising: stationary backing means, having a first end and a second end, and being made of a material which will not become fused when directly exposed to a molten metal for a limited period of time, means for moving the two tubes longitudinally past the backing means in a direction from the first end towards the second end at a predetermined speed, said backing means being positioned such that the two tubes to be welded together pass by adjacent to the upper portion of the backing means, one tube being adjacent one side of the backing means, and the second tube being adjacent the other side of the backing means, stationary electric arc welding means positioned above the backing means for depositing a molten metal between said parallel tubes above the backing means, means adjacent the electric arc welding means for depositing slag between the parallel tubes, said molten metal, when solidified, forming a weld between said parallel tubes, the upper surface of said backing means being in contact with and acting as a support for the molten metal while it solidifies, said backing means being of a predetermined length between the location of the electric arc welding means and the second end, the predetermined speed being such that the molten metal is chilled sufficiently so as to maintain its shape before it loses contact with the backing means, said predetermined speed also being such that there will not be shrinkage of the weld metal, due to cooling thereof, to such an extent that the thus welded together tubes will bind on the sides of the backing means.

4. The apparatus set forth in claim 3, wherein the backing means contains water cooling passage means therein.

5. Apparatus for welding together two parallel, spaced metallic tubes continuously along their adjacent longitudinal portions, comprising: stationary backing means, having a first end and a second end, and being made of a material which will not become fused when directly exposed to a molten metal for a limited period of time, means for moving the two tubes longitudinally past the backing means in a direction from the first end towards the second end at a predetermined speed, said backing means being positioned such that the two tubes to be welded together pass by adjacent to the upper portion of the backing means, one tube being adjacent one side of the backing means, and the second tube being adjacent the other side of the backing means, stationary electric arc welding means including a consumable electrode positioned above the backing means, means for continuously feeding the electrode at a predetermined rate, a passage means in the backing means, a filler wire which extends through the passage means, means for continuously feeding the filler wire at a predetermined rate, said passage means being positioned such in the backing means that the end thereof is positioned directly beneath the consumable electrode, so that an electric arc is struck between the electrode and the filler wire, thereby melting both the electrode and the filler wire, forming a molten metal, which when solidified, forms a weld between said parallel tubes, the upper surface of said backing means being in contact with and acting as a support for the molten metal while it solidifies, said backing means being of such a predetermined length between the location of the electrode and the second end that the molten metal is chilled sufficiently so as to maintain its shape before it loses contact with the backing means, said predetermined length also being such that there will not be shrinkage of the weld metal, due to cooling thereof, to such an extent that the thus welded together tubes will bind on the sides of the backing means.

References Cited

UNITED STATES PATENTS

| | | | |
|---|---|---|---|
| 1,844,263 | 2/1932 | Priebe | 219—160 |
| 2,719,210 | 9/1955 | Chapman | 219—137 |
| 3,059,099 | 10/1962 | Carpenter et al. | 219—137 |
| 3,127,503 | 3/1964 | Garner et al. | 219—124 |
| 3,221,135 | 11/1965 | Maier | 219—137 |

RICHARD M. WOOD, *Primary Examiner.*

C. L. ALBRITTON, *Assistant Examiner.*

U.S. Cl. X.R.

219—137, 160